United States Patent
Zhang et al.

(10) Patent No.: US 12,382,357 B2
(45) Date of Patent: Aug. 5, 2025

(54) NETWORK TRANSFER METHOD, APPARATUS, AND DEVICE

(71) Applicant: VIVO MOBILE COMMUNICATION CO., LTD., Guangdong (CN)

(72) Inventors: Pengfei Zhang, Guangdong (CN); Yanchao Kang, Guangdong (CN); Lufeng Han, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 366 days.

(21) Appl. No.: 18/166,566

(22) Filed: Feb. 9, 2023

(65) Prior Publication Data
US 2023/0189109 A1 Jun. 15, 2023

Related U.S. Application Data

(63) Continuation of application No. PCT/CN2021/111712, filed on Aug. 10, 2021.

(30) Foreign Application Priority Data

Aug. 11, 2020 (CN) .......................... 202010803197.8

(51) Int. Cl.
*H04W 36/26* (2009.01)
*H04W 16/28* (2009.01)
(Continued)

(52) U.S. Cl.
CPC ........... *H04W 36/26* (2013.01); *H04W 16/28* (2013.01); *H04W 28/18* (2013.01);
(Continued)

(58) Field of Classification Search
CPC ... H04W 36/26; H04W 36/142; H04W 16/28; H04W 28/18; H04W 36/0033; H04W 84/042
(Continued)

(56) References Cited

U.S. PATENT DOCUMENTS

| | | |
|---|---|---|
| 2011/0075608 A1 | 3/2011 | Chai et al. |
| 2011/0211567 A1 | 9/2011 | Chai et al. |

(Continued)

FOREIGN PATENT DOCUMENTS

| | | |
|---|---|---|
| CN | 101594663 A | 12/2009 |
| CN | 109964509 A | 7/2019 |

(Continued)

OTHER PUBLICATIONS

NTT Docomo, "New WID on Enhancement for the 5G Control Plane Steering of Roaming for UE in Connected mode", 3GPP TSG-CT WG1 Meeting #124e, C1-203878, Jun. 2-10, 2020, E-Meeting, 3GPP TSG-CT WG4 Meeting #98e, C4-203435, Jun. 2-12, 2020, E-Meeting.

*Primary Examiner* — Nghi H Ly
(74) *Attorney, Agent, or Firm* — Price Heneveld LLP

(57) ABSTRACT

This application discloses a network transfer method, an apparatus, and a device, and relates to the communications field. The method includes: receiving first extended steering of roaming SOR information sent by a network side device; in a case that the terminal device supports the a capability of negotiating extended SOR, determining a priority of an ongoing service based on the first extended SOR information; and performing a transfer operation matching the priority of the ongoing service, where the transfer operation is an operation that the terminal device transfers from a currently camping public land mobile network PLMN to a target PLMN.

20 Claims, 9 Drawing Sheets

(51) Int. Cl.
 *H04W 28/18* (2009.01)
 *H04W 36/00* (2009.01)
 *H04W 36/14* (2009.01)
 *H04W 84/04* (2009.01)

(52) U.S. Cl.
 CPC ..... *H04W 36/0033* (2013.01); *H04W 36/142* (2023.05); *H04W 84/042* (2013.01)

(58) Field of Classification Search
 USPC ............ 455/436, 442, 432.1, 435.1; 370/331
 See application file for complete search history.

(56) References Cited

U.S. PATENT DOCUMENTS

| | | | | |
|---|---|---|---|---|
| 2012/0100848 | A1* | 4/2012 | Miklos | H04W 16/08 |
| | | | | 455/432.1 |
| 2013/0217391 | A1* | 8/2013 | Klatt | H04W 8/24 |
| | | | | 455/435.2 |
| 2019/0053148 | A1 | 2/2019 | Lee et al. | |
| 2019/0174449 | A1* | 6/2019 | Shan | H04W 60/04 |
| 2019/0182655 | A1 | 6/2019 | Gupta et al. | |
| 2019/0268752 | A1 | 8/2019 | Buckley et al. | |
| 2019/0313238 | A1 | 10/2019 | Palanigounder et al. | |
| 2019/0357129 | A1 | 11/2019 | Park et al. | |
| 2020/0145915 | A1 | 5/2020 | Kumar et al. | |
| 2020/0221281 | A1 | 7/2020 | Rajadurai et al. | |
| 2021/0021636 | A1* | 1/2021 | Sbandi | H04L 63/1466 |
| 2021/0258869 | A1* | 8/2021 | Di Girolamo | H04W 48/18 |
| 2022/0095212 | A1 | 3/2022 | Takeda et al. | |

FOREIGN PATENT DOCUMENTS

| | | |
|---|---|---|
| CN | 110945886 A | 3/2020 |
| CN | 110999343 A | 4/2020 |
| EP | 3499958 A1 | 6/2019 |
| EP | 3681204 A1 | 7/2020 |
| WO | 2020145300 A1 | 7/2020 |

\* cited by examiner

NETWORK TRANSFER METHOD, APPARATUS, AND DEVICE

CROSS-REFERENCE TO RELATED APPLICATIONS

The present application is a bypass continuation application of International Application No. PCT/CN2021/111712 filed on Aug. 10, 2021, which claims priority to Chinese Patent Application No. 202010803197.8, filed with the China National Intellectual Property Administration on Aug. 11, 2020 and entitled "NETWORK TRANSFER METHOD, APPARATUS, AND DEVICE", which are incorporated herein by reference in their entireties.

TECHNICAL FIELD

This application relates to the communications field, and in particular, to a network transfer method, an apparatus, and a device.

BACKGROUND

Currently, in a case that a home network decides to transfer UE (User Equipment, UE, also called terminal device) to another network, the home network sends relevant indication to the UE. After the UE receives the indication, if there is an ongoing service in the UE, the UE does not perform the transfer to another network until all ongoing services are completed. This obviously affects efficiency of the UE transferring to another network.

SUMMARY

Embodiments of this application is intended to provide a network transfer method, an apparatus, and a device.

According to a first aspect, a network transfer method is provided and applied to a terminal device, where the method includes:
  receiving first extended steering of roaming SOR information sent by a network side device; in a case that the terminal device supports a capability of negotiating extended SOR, determining a priority of an ongoing service based on the first extended SOR information; and performing a transfer operation matching the priority of the ongoing service, where the transfer operation is an operation that the terminal device transfers from a currently camping public land mobile network PLMN to a target PLMN.

According to a second aspect, a network transfer apparatus is provided, where the apparatus includes:
  a receiving module, configured to receive first extended steering of roaming SOR information sent by a network side device; a determining module, configured to, in a case that the terminal device supports a capability of negotiating extended SOR, determine a priority of an ongoing service based on the first extended SOR information; and a processing module, configured to perform a transfer operation matching the priority of the ongoing service, where the transfer operation is an operation that the terminal device transfers from a currently camping public land mobile network PLMN to a target PLMN.

According to a third aspect, a terminal device is provided, including a memory, a processor, and a program or an instruction stored in the memory and capable of running on the processor, where when the program or the instruction is executed by the processor, the steps of the method according to the first aspect are implemented.

According to a fourth aspect, a network transfer method is provided and applied to a network side device, where the method includes:
  in a case that a terminal device supports negotiation and extended steering of roaming SOR capability, sending first extended SOR information to the terminal device, where the first extended SOR information is used to determine a priority of an ongoing service in the terminal device, the priority of the ongoing service matches a transfer operation to be performed by the terminal device, and the transfer operation is an operation that the terminal device transfers from a currently camping public land mobile network PLMN to a target PLMN.

According to a fifth aspect, a network transfer apparatus is provided, where the apparatus includes:
  a sending module, configured to, in a case that a terminal device supports negotiation and extended steering of roaming SOR capability, send first extended SOR information to the terminal device, where the first extended SOR information is used to determine a priority of an ongoing service in the terminal device, the priority of the ongoing service matches a transfer operation to be performed by the terminal device, and the transfer operation is an operation that the terminal device transfers from a currently camping public land mobile network PLMN to a target PLMN.

A sixth aspect provides a network-side device, including a memory, a processor, and a program or an instruction stored in the memory and capable of running on the processor, where when the program or the instruction is executed by the processor, the steps of the method according to the fourth aspect are implemented.

According to a seventh aspect, a readable storage medium is provided, where the readable storage medium stores a program or an instruction, and when the program or the instruction is executed by a processor, the steps of the foregoing method according to the first aspect are implemented, or when the program or the instruction is executed by a processor, the steps of the foregoing method according to the fourth aspect are implemented.

According to an eighth aspect, a computer program product is provided, where the computer program product includes a processor, a memory, and a program or an instruction stored in the memory and capable of running on the processor, and when the program or the instruction is executed by the processor, the steps of the method according to the first aspect are implemented, or when the program or the instruction is executed by the processor, the steps of the method according to the fourth aspect are implemented.

According to a ninth aspect, a chip is provided, where the chip includes a processor and a communications interface, the communications interface is coupled to the processor, and the processor is configured to run a program or an instruction of a terminal device or a network-side device, to implement the steps of the method according to the first aspect, or to implement the steps of the method according to the fourth aspect.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that the technologies described in the embodiments of this application are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application may be used interchangeably. The described technologies can be applied to both the systems and the radio technologies mentioned above as well as to other systems and radio technologies. However, a New Radio (NR) system is described below as an example, and the term NR is used in most of the descriptions, although these technologies can also be used in an application other than an application of the NR system, for example, a 6th-generation ($6^{th}$ Generation, 6G) communications system.

Figure 1:
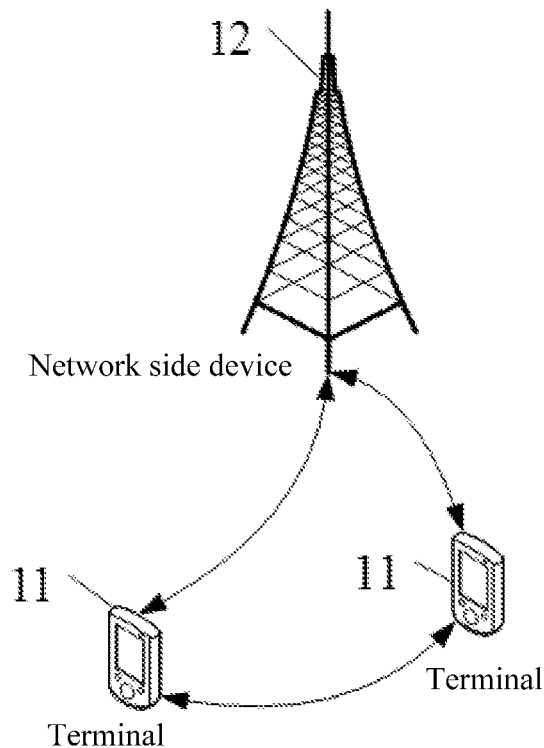
FIG. 1 is a block diagram of a wireless communications system to which an embodiment of this application can be applied.

FIG. 1 is a block diagram of a wireless communications system to which an embodiment of this application can be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (vehicle UE, VUE), and pedestrian user equipment (pedestrian UE, PUE). The wearable device includes a bracelet, a headset, and glasses. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmitting receiving point (TRP), or some other appropriate term in the art. As long as the same technical effect is achieved, the base station is not limited to a specific technical term. It should be noted that the base station in the NR system is taken only as an example in the embodiments of this application, but a specific type of the base station is not limited.

The following describes in detail the network transfer method provided in the embodiments of this application through specific embodiments and application scenarios thereof with reference to the accompanying drawings.

Figure 2:
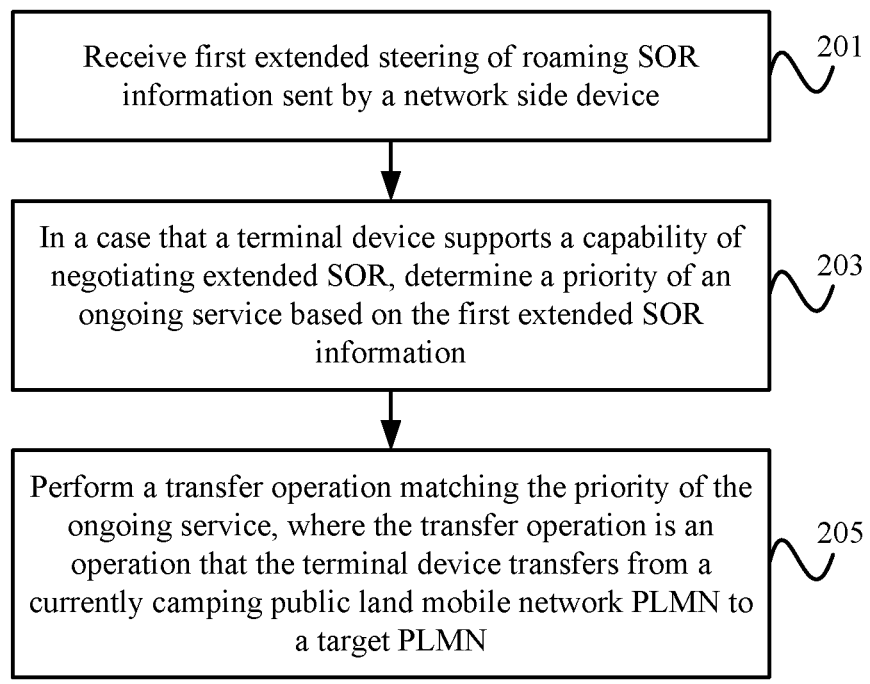
FIG. 2 is a flowchart of a network transfer method according to an embodiment of this application.

As shown in FIG. 2, an embodiment of this application provides a network transfer method performed by a terminal device. The method includes the following steps.

Step 201: Receive a first extended steering of roaming (SOR) information sent by a network side device.

Step 203: In a case that the terminal device supports a capability of negotiating extended SOR, determine a priority of an ongoing service based on the first extended SOR information.

Step 205: Perform a transfer operation matching the priority of the ongoing service, where the transfer operation is an operation that the terminal device transfers from a currently camping public land mobile network PLMN to a target PLMN.

In this embodiment of this application, in a case that the terminal device receives the first extended steering of roaming SOR information sent by the network side device and simultaneously supports the capability of negotiating extended SOR, the terminal device can first determine the priority of the ongoing service of the terminal device based on the received first extended SOR information, and then perform a corresponding network transfer operation based on the determined priority, that is, the public land mobile network (PLMN) where the terminal device currently camps is transferred to the target PLMN to implement network transfer. In this way, classifying the priority of the service and performing the network transfer corresponding to the priority of the service can avoid that transferring to another network is not performed until all ongoing services in the terminal device are completed, thereby improving efficiency of the network transfer.

Optionally, in the network transfer method in this embodiment of this application, step 203 may be performed as follows:

based on a target object included in the first extended SOR information, determining the priority of the ongoing service, where the target object includes at least one of the following:

(1) A service list, where the service list includes at least one service and a priority corresponding to the at least one service.

Optionally, the network side device configures one or more of the foregoing service lists for the terminal device, such as an Internet protocol (IP) multimedia subsystem (IP Multimedia Subsystem, IMS), a short message service (SMS), a multimedia priority service (MPS), a mission critical service (MCS), and time sensitive networking (TSN). In addition, the service list can also be preconfigured to the terminal device, or sent to the terminal device through an air-interface message. The terminal device can update to the local terminal device after receiving the service list. Specifically, based on such one or several service lists, it is specified which service is of high priority and/or which service is not of high priority.

(2) A network parameter list, where the network parameter list includes at least one service and a priority corresponding to the at least one service.

Optionally, the network parameter list further includes at least one of the following:

(1) Single network slice selection assistance information (S-NSSAI) related information; for example, a service belonging to a protocol data unit (PDU) session of some piece of the S-NSSAI is a high priority service.

(2) Data network name (DNN) related information; for example, a service connected to some data network (DNN/APN) is a high priority service.

(3) 5G QoS (Quality of Service, QoS) identifier (5G QoS Identifier, 5QI) related information; for example, a service belonging to some 5QI service is a high priority service.

(4) Protocol data unit PDU session related information; for example, a PDU SESSION service established using a request type of some PDU SESSION is a high priority service, such as an "initial request", an "emergency request", an "existing emergency PDU session", and a "MA PDU request".

(5) Internet protocol IP address information; for example, the PDU SESSION whose IP address belongs to some IP address is a high priority service; and a service that determines an address range to which a target communication IP address of the UE belongs is a high priority service.

(6) Packet filter information; for example, a service on PDU SESSION/QOS FLOW containing some Packet filter is a high priority service.

Optionally, in the network transfer method in this embodiment of this application, when the ongoing service determined in step 203 have different priorities, step 205 can be performed as different network transfer solutions correspondingly, including but not limited to the following specific embodiments.

In the specific embodiment 1, step 205 may be performed as follows:

in a case that the ongoing service includes a service of a first priority, performing the transfer operation after the service of the first priority is completed, where the first priority is higher than a preset priority.

In this embodiment of this application, when it is determined that the ongoing service in the terminal device has a higher priority according to the received first extended SOR information, the network transfer can be performed after this task is completed, to ensure efficiency of the network transfer and avoid affecting communication quality.

In the specific embodiment 2, step 205 may be performed as follows:

in a case that the ongoing service does not include the service of the first priority, performing the transfer operation.

In this embodiment of this application, when it is determined that the ongoing service in the terminal device has a lower priority according to the received first extended SOR information, the network transfer can be performed immediately without waiting for the completion of the task, to improve efficiency of the network transfer.

In the specific embodiment 3, step 205 may be performed as follows:

in a case that the ongoing service does not include the service of the first priority, performing the transfer operation after a preset timer expires.

In this embodiment of this application, when it is determined that the ongoing service in the terminal device has a lower priority according to the received first extended SOR information, the network transfer can be performed after waiting for a period of time, and in addition, it is unnecessary to consider whether the service is completed, so as to improve efficiency of the network transfer.

Optionally, in the network transfer method in this embodiment of this application, before step 203, the method may further include one of the following:

(1) in a case that a PLMN in which the terminal device currently camps is a visited PLMN (V-PLMN), verifying the first extended SOR information. In this way, it can be determined whether the first extended SOR information is tampered with before the network transfer is performed, to ensure security and accuracy of the information.

(2) in a case that the PLMN in which the terminal device currently camps is a home PLMN (H-PLMN), skipping verifying the first extended SOR information.

Optionally, in the network transfer method in this embodiment of this application, before step 203, the method may further include the following:

reporting first indication information to the network side device, where the first indication information is used to indicate whether the terminal device supports the capability of negotiating extended SOR.

Optionally, the terminal device can determine whether the terminal device supports the capability of negotiating extended SOR based on capability of the terminal device, and report to the network side device, so that the network side device can learn the specific capability of the terminal device in time.

It should be noted that in the network transfer method in this embodiment of this application, the sequence of the step of reporting the first indication information to the network side device and step 201 is not specifically limited.

Optionally, the network transfer method in this embodiment of this application may further include the following:

in a case that the terminal device supports the capability of negotiating extended SOR, sending extended SOR information to the network side device. In other words, the terminal device can actively report the extended SOR information currently stored locally to the network side device in a case that the terminal device supports the capability of negotiating extended SOR.

Optionally, in the network transfer method in this embodiment of this application, the terminal device can report the extended SOR information currently stored locally based on different processes, including but not limited to the following specific embodiments:

In the specific embodiment I, the above step of sending extended SOR information to the network side device can be performed as follows:

in a case that the terminal device supports the capability of negotiating extended SOR, sending second extended SOR information to the network side device in a process that the terminal device registers in the currently camping PLMN.

Further optionally, the second extended SOR information can be carried in a registration request for sending.

Further optionally, in the network transfer method in the specific embodiment I, the following can also be included:
replacing the second extended SOR information with the first extended SOR information. In this way, the extended SOR information stored locally in the terminal device can be updated.

It should be noted that when the PLMN in which the terminal device currently camps is a visited PLMN, it is necessary to update the local stored extended SOR information based on the first extended SOR information in a case that the first extended SOR information is verified.

In the specific embodiment II, the above step of sending extended SOR information to the network side device can be performed as follows:

in a case that both the terminal device and the network side device support the capability of negotiating extended SOR, sending third extended SOR information to the network side device in a process of updating triggered and extended SOR information.

In other words, in a case that the terminal device supports the capability of negotiating extended SOR and simultaneously learns that the network side device supports the capability of negotiating extended SOR, the terminal device can trigger the update of the extended SOR information, and in the updating process, report currently locally stored third extended SOR information. In this way, further optionally, in the network transfer method in the specific embodiment II, in a case that the network side device supports the capability of negotiating extended SOR, in the process of updating the triggered extended SOR information, before sending the third extended SOR information to the network side device, the following can also be included:

receiving second indication information sent by the network side device, where the second indication information is used to indicate whether the network side device supports the capability of negotiating extended SOR; and in a case that the second indication information indicates that the network side device supports the capability of negotiating extended SOR, triggering a process of updating the extended SOR information. In other words, the network side device can explicitly indicate to the terminal device whether the terminal device supports the capability of negotiating extended SOR through the second indication information, so that the terminal device can determine whether the terminal device can trigger the process of updating the extended SOR information.

Further optionally, in the network transfer method in the specific embodiment II, the following can also be included: in a case that the latest extended SOR information sent by the network side device in response to an update process of the extended SOR information is received, updating the second extended SOR information according to the latest extended SOR information. In this way, that the terminal device can store the latest extended SOR information locally can be ensured, so as to ensure accurate judgment of the priority of the ongoing service, thereby helping improving efficiency of the network transfer.

Figures 3, 4:
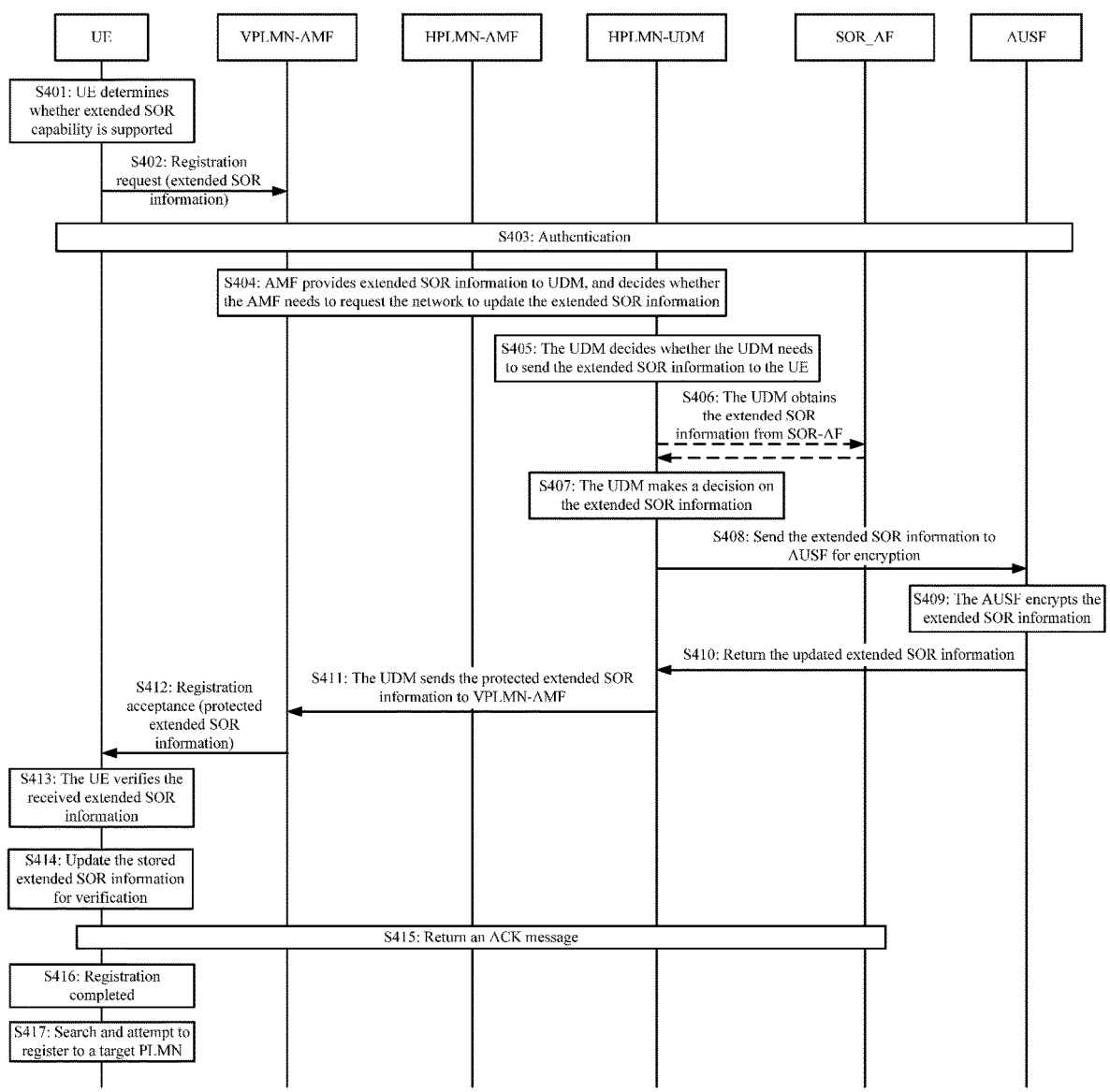
FIG. 3 is another flowchart of a network transfer method according to an embodiment of this application.
FIG. 4 is a schematic diagram of a registration process when UE camps in a VPLMN according to an embodiment of this application.

As shown in FIG. 3, this embodiment of this application provides a network transfer method executed by the network side device. The method includes the following steps:

Step 301: In a case that the terminal device supports negotiation and extended steering of roaming SOR capability, send first extended SOR information to the terminal device. The first extended SOR information is used to determine a priority of an ongoing service in the terminal device, the priority of the ongoing service matches a transfer operation to be performed by the terminal device, and the transfer operation is an operation that the terminal device transfers from a currently camping public land mobile network PLMN to a target PLMN.

In this embodiment of this application, the network side device can provide the first extended roaming oriented SOR information to the terminal device, so that in a case that the terminal device supports the capability of negotiating extended SOR, the terminal device can first determine the priority of the ongoing service of the terminal device based on the received first extended SOR information, and then perform a corresponding network transfer operation based on the determined priority, that is, the public land mobile network (PLMN) where the terminal device currently camps is transferred to the target PLMN to implement network transfer. In this way, classifying the priority of the service and performing the network transfer corresponding to the priority of the service by the terminal device can avoid that transferring to another network is not performed until all ongoing services in the terminal device are completed, thereby improving efficiency of the network transfer.

Optionally, in the network transfer method in this embodiment of this application, the first extended SOR information includes a target object, and the target object is used to determine the priority of the ongoing service in the terminal device, where the target object includes at least one of the following:

(1) A service list, where the service list includes at least one service and a priority corresponding to the at least one service.

Optionally, the network side device can configure one or more of the above service lists for the terminal device, such as a IMS, a SMS, a MPS, a MCS, and TSN. In addition, the service list can also be preconfigured to the terminal device, or sent to the terminal device through an air-interface message. The terminal device can update to the local terminal device after receiving the service list. Specifically, based on such one or several service lists, it is specified which service is of high priority and/or which service is not of high priority.

(2) A network parameter list, where the network parameter list includes at least one service and a priority corresponding to the at least one service.

Optionally, the network parameter list further includes at least one of the following:

(1) Single network slice selection assistance information S-NSSAI related information; for example, a service belonging to a protocol data unit PDU session of some piece of the S-NSSAI is a high priority service.

(2) Data network name DNN related information; for example, a service connected to some data network (DNN/APN) is a high priority service.

(3) 5G QoS identifier (5QI) related information; for example, a service belonging to some 5QI service is a high priority service.

(4) Protocol data unit PDU session related information; for example, a PDU SESSION service established using a request type of some PDU SESSION is a high priority service, such as an "initial request", an "emergency request", an "existing emergency PDU session", and a "MA PDU request".

(5) Internet protocol IP address information; for example, the PDU SESSION whose IP address belongs to some IP address is a high priority service; and a service that determines an address range to which a target communication IP address of the UE belongs is a high priority service.

(6) Packet filter information; for example, a service on PDU SESSION/QOS FLOW containing some Packet filter is a high priority service.

Optionally, in the network transfer method in this embodiment of this application, based on the difference of the PLMN where the terminal device currently camps, different processing can be performed on the first extended SOR information before sending the first extended SOR information to the terminal device, including but not limited to the following specific embodiments.

In the specific embodiment 1, in a case that a PLMN in which the terminal device currently camps is a visited PLMN, the first extended SOR information is encrypted extended SOR information. In other words, in a case that the PLMN where the terminal device currently camps is a visited PLMN, to avoid that information is tampered with, the information can be encrypted first, thereby ensuring security and accuracy of the information.

In the specific embodiment 2, in a case that a PLMN in which the terminal device currently camps is a home PLMN, the first extended SOR information is unencrypted extended SOR information.

Optionally, in the network transfer method in this embodiment of this application, before step 301, the method further includes:

receiving first indication information reported by the terminal device, where the first indication information is used to indicate whether the terminal device supports the capability of negotiating extended SOR.

Optionally, the specific capability of the terminal device can be learned in time by receiving indication information that the terminal device determines whether the terminal device supports the capability of negotiating extended SOR according to capability of the terminal device.

Optionally, the network transfer method in this embodiment of this application may further include the following:

in a case that the first indication information indicates that the terminal device supports the capability of negotiating extended SOR, receive extended SOR information sent by the terminal device. In other words, the network side device can receive the extended SOR information locally stored in the terminal device currently and actively reported by the terminal device when the terminal device determines that the terminal device supports the capability of negotiating extended SOR.

Optionally, in the network transfer method in this embodiment of this application, the extended SOR information currently stored in the above terminal device locally can be reported by the terminal device based on different processes, including but not limited to the following specific embodiments:

In the specific embodiment I, the network transfer method in this embodiment of this application may further include the following:

in a case that the first indication information indicates that the terminal device supports the capability of negotiating extended SOR, receiving second extended SOR information sent by the terminal device in a process of registering in the currently camping PLMN.

Further optionally, the second extended SOR information can be carried in a registration request for sending.

Further optionally, in the network transfer method in this embodiment of this application, before step 301, the method further includes:

based on at least one of the second extended SOR information and extended SOR information corresponding to the network side device, determining the first extended SOR information.

Optionally, the first extended SOR information includes one of the following:

(1) The second extended SOR information and information corresponding to a union set of the extended SOR information corresponding to the network side device.

(2) The second extended SOR information and information corresponding to an intersection set of the extended SOR information corresponding to the network side device.

(3) The second extended SOR information.

(4) The extended SOR information corresponding to the network side device.

In the specific embodiment II, the network transfer method in this embodiment of this application may further include:

in a case that the first indication information indicates that the terminal device supports the capability of negotiating extended SOR, receiving third extended SOR information sent by the terminal device, when the terminal device learns the network side device supports the capability of negotiating extended SOR, in a process of updating triggered and extended SOR information.

In other words, in a case that the terminal device supports the capability of negotiating extended SOR and has learned that the network side device supports the capability of negotiating extended SOR, the network side device receives third extended SOR information currently stored locally reported by the terminal device in a process of updating the extended SOR information triggered by the terminal device.

Further optionally, before the receiving third extended SOR information sent by the terminal device, the method further includes:

sending second indication information to the terminal device, where the second indication information is used to indicate whether the network side device supports the capability of negotiating extended SOR. In other words, the network side device can explicitly indicate to the terminal device whether the terminal device supports the capability of negotiating extended SOR through the second indication information, to indicate whether the terminal device can trigger the process of updating the extended SOR information.

Optionally, in the network transfer method in this embodiment of this application, before step 301, the method further includes:

based on at least one of the third extended SOR information and extended SOR information corresponding to the network side device, determining the first extended SOR information.

Optionally, the first extended SOR information includes one of the following:

(1) The third extended SOR information and information corresponding to a union set of the extended SOR information corresponding to the network side device.

(2) The third extended SOR information and information corresponding to an intersection set of the extended SOR information corresponding to the network side device.

(3) The third extended SOR information.

(4) The extended SOR information corresponding to the network side device.

The network transfer method in this embodiment of this application is described in detail below reference to FIG. 4 to FIG. 8.

Referring to FIG. 4, this embodiment of this application provides a registration process when the UE camps in a VPLMN. In this process, the UE provides EXT-SOR information (that is, extended SOR information) to a network to assist the network in making a decision for extended SOR information. The network updates the extended SOR information to the UE, including but not limited to the following steps.

S401: UE determines whether extended SOR capability is supported.

Optionally, the UE decides whether to add extended SOR information in a registration request according to capability of the UE, such as whether the UE is R17UE. If the extended SOR capability is supported, go to S402.

S402: The UE sends the registration request to the network.

Optionally, the registration request contains extended SOR information.

S403: Authentication process. After the UE initiates the registration request, a network authentication process is triggered.

S404: An access and mobility management function (AMF) provides extended SOR information to unified data management (UDM), and decides whether the access and mobility management function needs to request the network to update the extended SOR information.

Optionally, after receiving the extended SOR information provided by the UE, a V-AMF provides the information to the UDM through a H-AMF. The V-AMF may decide whether the V-AMF obtains the extended SOR information from the UDM according to saved UE context information.

S405: The UDM decides whether the UDM needs to send the extended SOR information to the UE.

Optionally, a condition in which HPLMN UDM determines whether the HPLMN UDM sends the extended SOR information to the UE is that, in addition to signing information of the UE, configuration information of the HPLMN, and a current load, whether the UE supports the extended SOR capability.

(1) If the HPLMN UDM decides to perform an extended SOR function on the UE after determination, it may be necessary to determine whether S406 needs to be performed based on UDM configuration. Further, if the UDM configuration requires obtaining extended SOR information from SOR-AF, S406 is performed. Otherwise, S406 is skipped.

(2) If the HPLMN UDM decides not to perform the extended SOR function on the UE after determination, processing of the extended SOR information is skipped and a registration process is performed.

S406: The UDM obtains the extended SOR information from the SOR-AF.

Optionally, the extended SOR information corresponds to a final storage location in the UE, which may be a plaintext or encrypted information. If being finally stored in ME, the extended SOR information is a plaintext. If being finally stored in an universal subscriber identity module (USIM) card, the extended SOR information is encrypted information.

S407: The UDM makes a decision on the extended SOR information.

Optionally, the UDM makes a decision according to extended SOR information A provided by the UE and extended SOR information B generated by the HPLMN (the information is generated by the UDM of the H-PLMN or the SOR-AF), and decides extended SOR information C finally sent to the UE. According to a strategy of the HPLMN, a result of this decision may be but not only the following: C may be a union set of A and B; C may be an intersection set of A and B; C may be equal to B; and C may be equal to A.

S408 to S410: The UDM sends the generated extended SOR information to AUSF for encryption and returns an encryption result.

It can be understood that to avoid the generated extended SOR information being tampered with by the V-PLMN, the extended SOR information needs to be encrypted.

S411: The HPLMN sends the protected extended SOR information to the V-AMF through the H-AMF.

S412: The HPLMN sends the protected extended SOR information to the V-AMF through the H-AMF.

S413: The UE verifies the received extended SOR information.

Optionally, the UE uses a security algorithm agreed in advance and a received security parameter to verify the received extended SOR information, so as to verify whether the information has been tampered with. If the information is tampered with, a processing process of the tampered SOR information begins. If the information is not tampered with, S414 is performed.

S414: Update the stored extended SOR information. That is, after the latest extended SOR information is received, the information is updated.

S415 to S416: According to the received extended SOR information, determine that the UE is successfully registered and camps in the current PLMN; or search and attempt to register to a target PLMN.

Optionally, if preferred PLMN/access technology combination is specified in the received extended SOR information, and the current V-PLMN is not in the list, the UE will find and try to register to the target PLMN; Otherwise, the registration is completed and resides in the V-PLMN.

Figure 5:
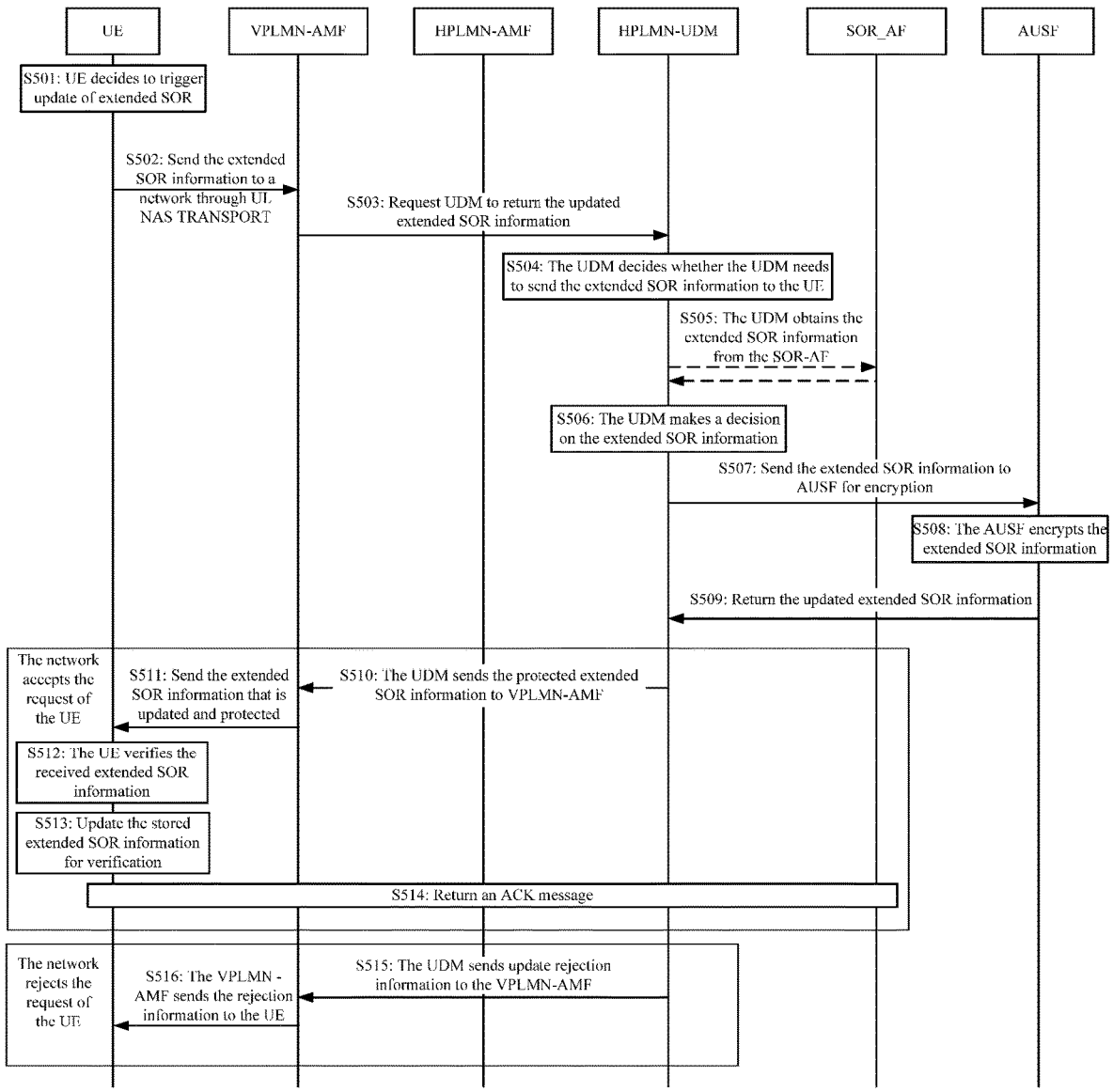
FIG. 5 is a schematic diagram of an information update process when UE camps in a VPLMN according to an embodiment of this application.

Referring to FIG. 5, this embodiment of this application provides an information update process in a case that the UE camps in the VPLMN, that is, an updating process of the extended SOR information negotiated with the network and initiated in a case that the UE camps in the VPLMN. In this process, the UE initiates updating the extended SOR information to the network and provides the updated extended SOR information to assist the network in updating the extended SOR information, and sends the updated extended SOR information to the UE. The process includes two cases:

the network accepts the update of the extended SOR information and the network rejects the update of the extended SOR information, including but not limited to the following steps.

S501: The UE decides to initiate the update of the extended SOR information, such as changing a priority of some service.

S502: The UE sends the extended SOR information to the network through UL NAS TRANSPORT.

Optionally, the extended SOR information may be contained in a Payload container of an UL NAS TRANSPORT message. The Payload container may be an extended SOR transparent container type, which contains the updated extended SOR information.

S503: The V-AMF sends the updated extended SOR information to the UDM of the HPLMN through the H-AMF.

S504: The UDM decides whether the UDM needs to send the extended SOR information to the UE.

Optionally, a condition in which the HPLMN UDM decides whether the HPLMN UDM sends the extended SOR information to the UE is that a decision is made based on signing information of the UE, HPLMN configuration information, and the like.

(1) If the HPLMN UDM decides to perform the update of the extended SOR on the UE after determination, it may be necessary to determine whether S505 needs to be performed based on UDM configuration. Further, if the UDM configuration requires obtaining extended SOR information from SOR-AF, S505 is performed. Otherwise, S505 is skipped. S506 to S510 are the same as S407 to S411 in the embodiment shown in FIG. 4 above.

(2) If the HPLMN UDM decides not to perform the extended SOR function on the UE after determination, S506 to S509 are skipped and S515 is performed.

Note: S510 to S514 are that the network agrees to update the extended SOR information; S515 to S516 are that the network rejects the update of the extended SOR information.

S511: The V-AMF sends the extended SOR information that is updated and protected to the UE through DL NAS TRANSPORT. S512 to S514 are the same as S413 to S415 in the embodiment shown in FIG. 4 above.

S515: The UDM sends update rejection message to the V-AMF. This message may contain an indication of rejecting the update of the extended SOR information.

S516: The V-AMF sends the rejection message to the UE. The UE may not initiate an update request again within a preset time.

Figure 6:
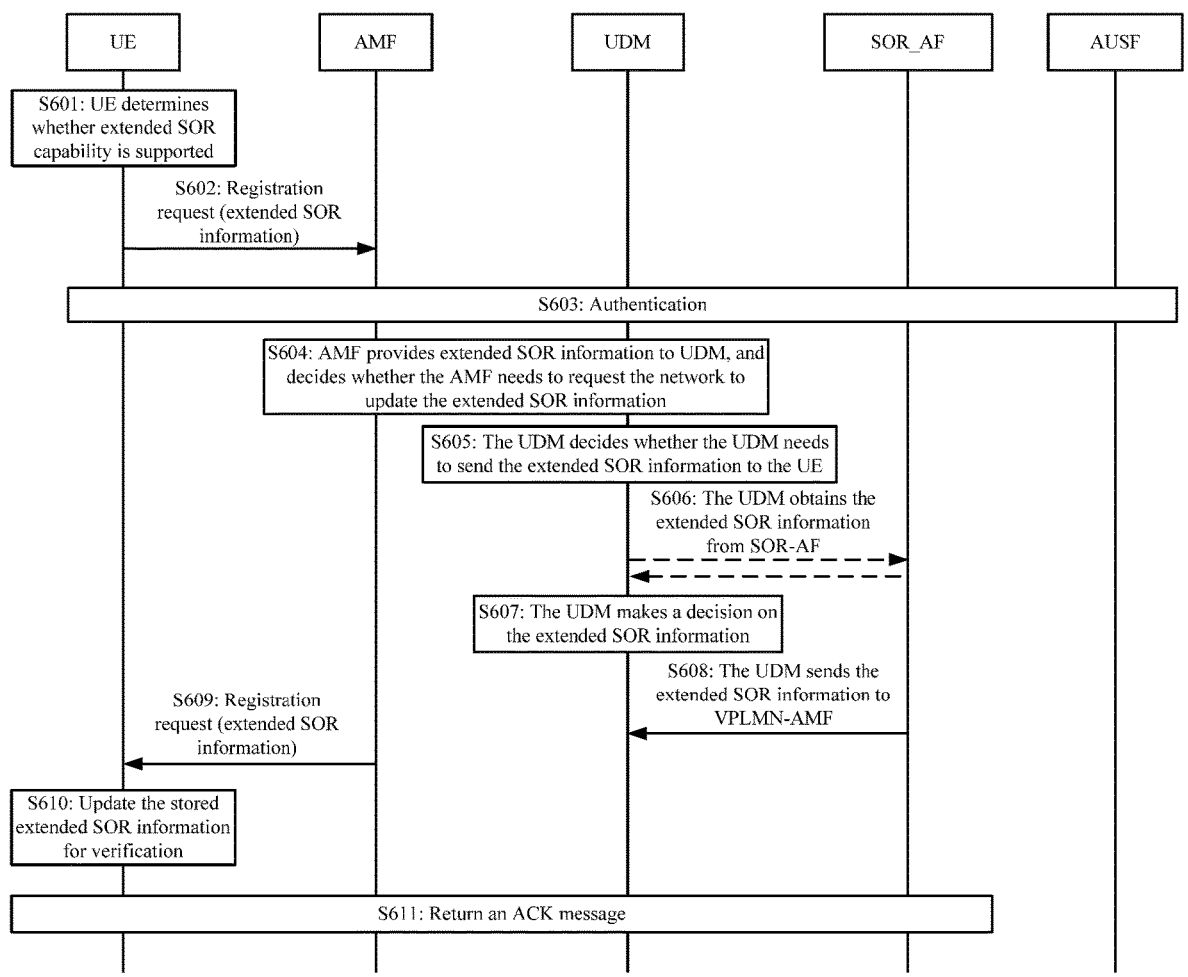
FIG. 6 is a schematic diagram of a registration process when UE camps in a HPLMN according to an embodiment of this application.

Referring to FIG. 6, this embodiment of this application provides a registration process in a case that the UE camps in the HPLMN. In this process, because the UE does not worry about the network tampering with the extended SOR information in a case that the UE camps in the HPLMN, the UE does not need to encrypt the extended SOR information sent by the UDM. Correspondingly, the UE does not need to verify whether the information was tampered with in a case that the UE receives the expanded SOR information, including but not limited to the following steps.

S601: UE determines whether extended SOR capability is supported.

Optionally, the UE decides whether to add extended SOR information in a registration request according to capability of the UE, such as whether the UE is R17UE. If the extended SOR capability is supported, go to S602.

S602: The UE sends the registration request to the network.

Optionally, the registration request contains extended SOR information.

S603: Authentication process. After the UE initiates the registration request, a network authentication process is triggered.

S604: an AMF provides the extended SOR information to UDM and decides whether to request the network to update the extended SOR information.

Optionally, after receiving the extended SOR information provided by the UE, the AMF provides the information to the UDM. The AMF may decide whether the AMF obtains the extended SOR information from the UDM according to saved UE context information.

S605 to S607 are the same as S405 to S407 in the embodiment shown in FIG. 4 above.

Because the UE requests registration to an HPLMN and does not worry about the HPLMN being tampered with by the network, the UDM decided not to encrypt the negotiated and extended SOR information.

S608: The UDM sends the extended SOR information to the AMF.

S610: Update the stored extended SOR information, that is, update the information after receiving the latest extended SOR information.

S611: Decide whether it is needed to send an ACK message that the extended SOR information is successfully sent to the HPLMN according to an UDM indication.

Figure 7:
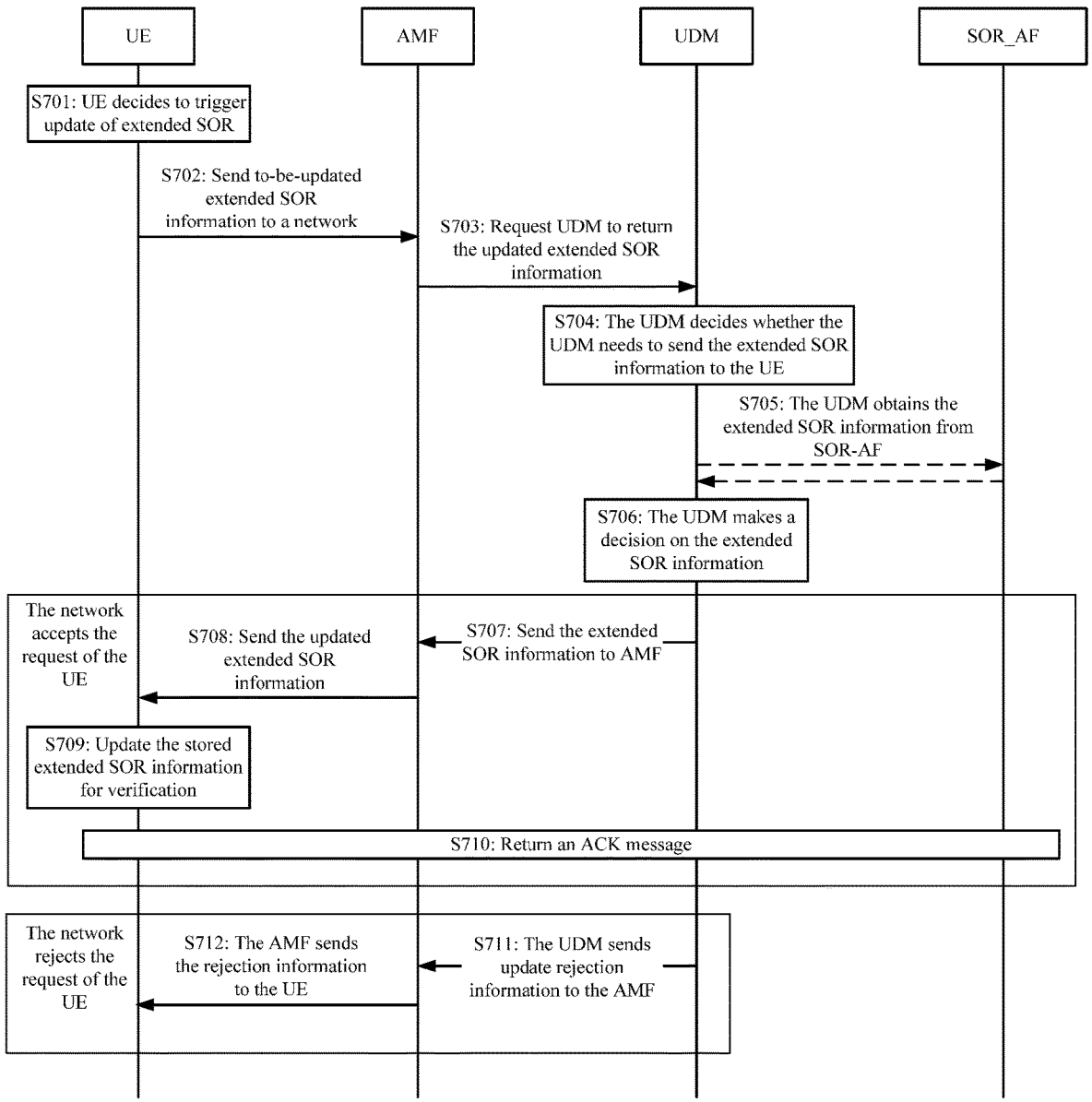
FIG. 7 is a schematic diagram of an information update process when an UE camps in a HPLMN according to an embodiment of this application.

Referring to FIG. 7, this embodiment of this application provides an information update process in a case that the UE camps in the HPLMN, that is, an updating process of the extended SOR information negotiated with the network and initiated in a case that the UE camps in the HPLMN. In this process, the UE initiates updating the extended SOR information to the network and provides the updated extended SOR information to assist the network in updating the extended SOR information, and sends the updated extended SOR information to the UE. The process includes two cases: the network accepts the update of the extended SOR information and the network rejects the update of the extended SOR information, including but not limited to the following steps.

S701: The UE decides to initiate the update of the extended SOR information, such as changing a priority of some service.

S702: The UE sends the extended SOR information to the network through UL NAS TRANSPORT.

Optionally, the extended SOR information may be contained in a Payload container of an UL NAS TRANSPORT message. The Payload container may be an extended SOR transparent container type, which contains the updated extended SOR information.

S703: The AMF sends this updated extended SOR information to the UDM.

S704: The UDM decides whether the UDM needs to send the extended SOR information to the UE.

Optionally, the UDM decides whether the HPLMN UDM sends the extended SOR information to the UE based on signing information of the UE, HPLMN configuration information, and the like.

(1) If the UDM decides to perform an extended SOR update on the UE after determination, it may be necessary to determine whether S705 needs to be performed based on UDM configuration. Further, if the UDM configuration requires obtaining extended SOR information from SOR-AF, S705 is performed. Otherwise, S705 is skipped. S705 to S706 are the same as S406 to S407 in the embodiment shown in FIG. 4 above.

(2) If the HPLMN UDM decides not to perform the extended SOR function on the UE after determination, S707 to S710 are skipped and S711 is performed.

Note: S707 to S710 are that the network agrees to update the extended SOR information; S711 to S712 are that the network rejects the update of the extended SOR information.

S708: The AMF sends the extended SOR information that is updated and protected to the UE through DL NAS TRANSPORT. S709 to S710 are the same as S414 to S415 in the embodiment shown in FIG. 4 above.

S711: The UDM sends update rejection message to the V-AMF. This message may contain an indication of rejecting the update of the extended SOR information.

S712: The AMF sends the rejection message to the UE. The UE may not initiate an update request again within a preset time.

Figure 8:
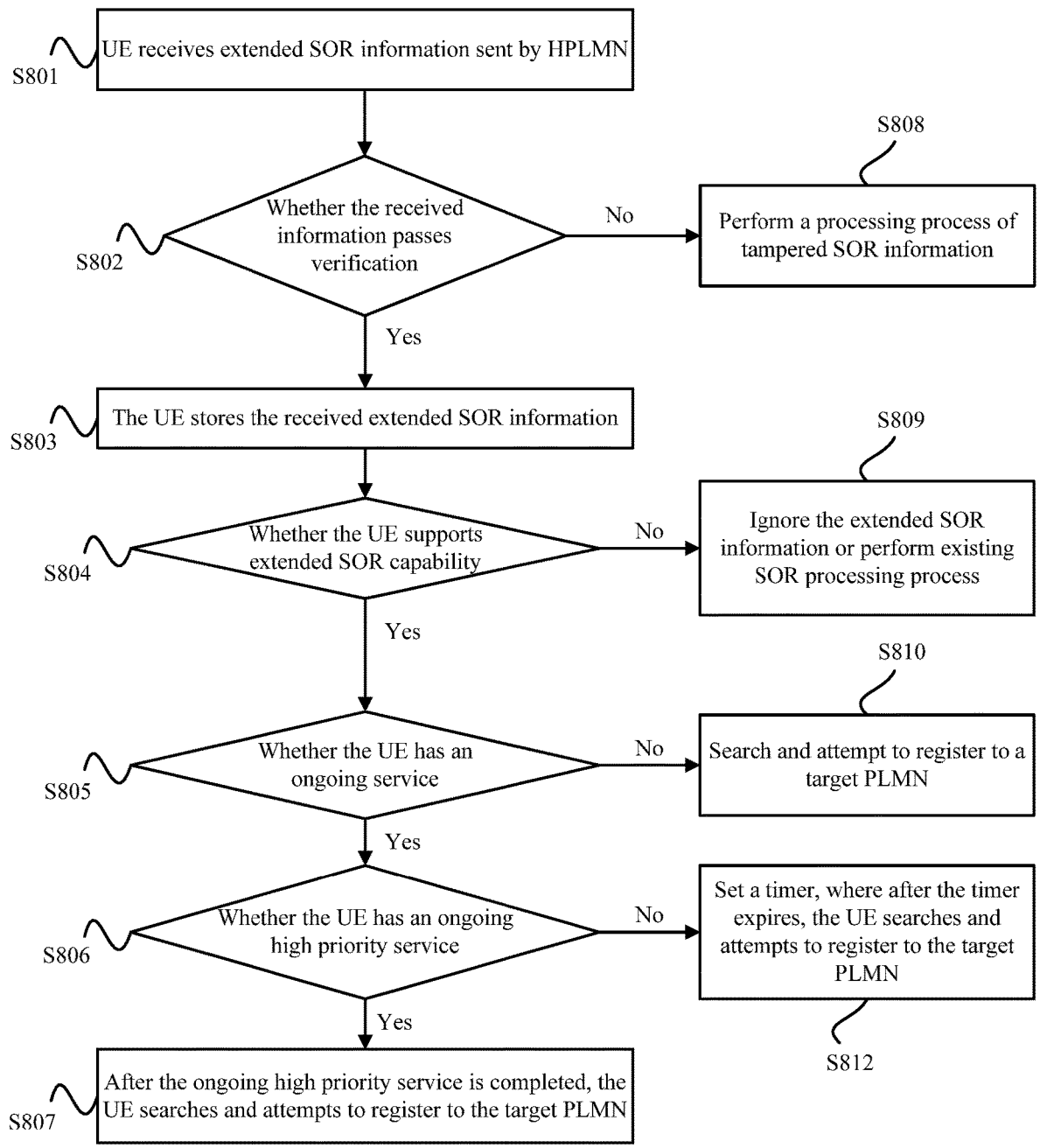
FIG. 8 is a schematic diagram of a processing process after UE receives extended SOR information according to an embodiment of this application.

Referring to FIG. 8, an embodiment of this application provides a processing process after UE receives extended SOR information, including but not limited to the following steps.

S801: UE receives extended SOR information sent by HPLMN.

S802: The UE verifies the received information.

Optionally, the UE uses a security algorithm agreed in advance and a received security parameter to verify the received extended SOR information, so as to verify whether the information has been tampered with. If it is found that the information is tampered with, a processing process of the tampered SOR information begins, that is, the UE sets a current VPLMN network as the lowest priority. The UE can immediately release the connection and search another network. If there is no other network available, the UE can camp and register on the current network. If the information is not tampered with, S808 is performed.

S803: The UE stores the received extended SOR information.

Optionally, the received extended SOR information can be stored in an USIM card or/and ME. Optionally, the information can be stored in the USIM or ME according to the received message type.

S804: The UE determines whether extended SOR capability is supported. If the extended SOR capability is not supported, S809 is performed. If the extended SOR capability is supported, S805 is performed.

S805: Determine whether the UE has an ongoing service. If the UE has no ongoing service, S810 is performed. If the UE has an ongoing service, S806 is performed.

S806: Determine whether there is an ongoing high priority service. If there is an ongoing high priority service, S812 is performed. If there is no ongoing high priority service, S807 is performed.

S807: After the ongoing high priority service is completed, the UE searches and attempts to register to a target PLMN.

S808: A processing process of the tampered SOR information is performed.

S809: The UE does not support the extended SOR capability, and processing can be performed as follows: ignore the extended SOR information, or perform a R16 SOR process according to a received preferred PLMN/access technology combinations list.

S810: Search and attempt to register to the target PLMN.

S811: Set a timer, where after the timer expires, the UE searches and attempts to register to the target PLMN.

It can be seen from the above embodiments that the UE determines, according to the extended SOR information provided by the UDM, such as high priority service information, that if there is no high priority service in the ongoing service, the UE does not need to enter an idle state until a low priority service ends, and tries to select a network and access to a target network.

It should be noted that an execution subject of the network transfer method performed by a terminal device according to an embodiment of this application may be a network transfer apparatus, or a control module for performing the network transfer method in the network transfer apparatus. In this embodiment of this application, the network transfer apparatus according to an embodiment of this application is described by using an example in which the network transfer apparatus performs the network transfer method.

Figure 9:
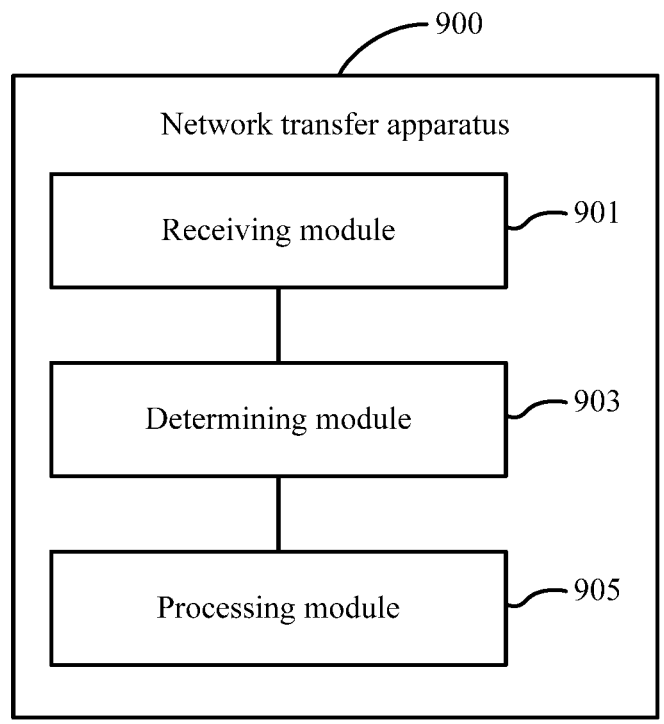
FIG. 9 is a structural diagram of a network transfer apparatus according to an embodiment of this application.

As shown in FIG. 9, an embodiment of this application provides a network transfer apparatus 900. The network transfer apparatus 900 includes a receiving module 901, a determining module 903, and a processing module 905.

The receiving module 901 is configured to receive first extended steering of roaming SOR information sent by a network side device. The determining module 903 is configured to, in a case that the terminal device supports the capability of negotiating extended SOR, determine a priority of an ongoing service based on the first extended SOR information. The processing module 905 is configured to perform a transfer operation matching the priority of the ongoing service, where the transfer operation is an operation that the terminal device transfers from a currently camping public land mobile network PLMN to a target PLMN.

Optionally, in the network transfer apparatus 900 in this embodiment of this application, the processing module 905 may be specifically configured to:

in a case that the ongoing service includes a service of a first priority, perform the transfer operation after the service of the first priority is completed, where the first priority is higher than a preset priority.

Optionally, in the network transfer apparatus 900 in this embodiment of this application, the processing module 905 may be specifically configured to:

in a case that the ongoing service does not include the service of the first priority, perform the transfer operation.

Optionally, in the network transfer apparatus 900 in this embodiment of this application, the processing module 905 may be specifically configured to:

in a case that the ongoing service does not include the service of the first priority, perform the transfer operation after a preset timer expires.

Optionally, in the network transfer apparatus 900 in this embodiment of this application, the determining module 903 may be specifically configured to:

based on a target object contained in the first extended SOR information, determine the priority of the ongoing service, where the target object includes at least one of the following: a service list, where the service list includes at least one service and a priority corresponding to the at least one service; and a network parameter list, where the network parameter list includes at least one service and a priority corresponding to the at least one service.

Optionally, in the network transfer apparatus 900 in this embodiment of this application, the network parameter list further includes at least one of the following:

single network slice selection assistance information S-NSSAI related information; data network name DNN related information; 5G quality of service QoS identifier related information; protocol data unit PDU session related information; Internet protocol IP address information; and packet filter information.

Optionally, the network transfer apparatus 900 in this embodiment of this application may further include a verification module. The verification module is configured to, in a case that the terminal device supports the capability of negotiating extended SOR, before the determining a priority of an ongoing service based on the first extended SOR information, perform one of the following operations:

in a case that a PLMN in which the terminal device currently camps is a visited PLMN, verifying the first extended SOR information; and in a case that the PLMN in which the terminal device currently camps is a home PLMN, skipping verifying the first extended SOR information.

Optionally, the network transfer apparatus 900 in this embodiment of this application may further include:

a sending module, configured to, in a case that the terminal device supports the capability of negotiating extended SOR, before the determining a priority of an ongoing service based on the first extended SOR information, report first indication information to the network side device, where the first indication information is used to indicate whether the terminal device supports the capability of negotiating extended SOR.

Optionally, in the network transfer apparatus 900 in this embodiment of this application, the sending module may be further configured to:

in a case that the terminal device supports the capability of negotiating extended SOR, send second extended SOR information to the network side device in a process that the terminal device registers in the currently camping PLMN.

Optionally, the network transfer apparatus 900 in this embodiment of this application may further include:

a first updating module, configured to replace the second extended SOR information with the first extended SOR information.

Optionally, in the network transfer apparatus 900 in this embodiment of this application, the sending module may be further configured to:

in a case that both the terminal device and the network side device support the capability of negotiating extended SOR, send third extended SOR information to the network side device in a process of updating triggered and extended SOR information.

Optionally, the network transfer apparatus 900 in this embodiment of this application may further include:

a second updating module, configured to, in a case that the latest extended SOR information sent by the network side device in response to a process of updating the extended SOR information, replace the third extended SOR information with the latest extended SOR information.

Optionally, in the network transfer apparatus 900 in this embodiment of this application, the receiving module 901 is further configured to, in a case that the network side device supports the capability of negotiating extended SOR, before the sending second extended SOR information to the network side device in a process of updating triggered and extended SOR information, receive second indication information sent by the network side device, where the second indication information is used to indicate whether the network side device supports the capability of negotiating extended SOR. The processing module 905 is further configured to, in a case that the second indication information indicates that the network side device supports the capability of negotiating extended SOR, trigger a process of updating the extended SOR information.

In this embodiment of this application, in a case that the terminal device receives the first extended steering of roaming SOR information sent by the network side device and simultaneously supports the capability of negotiating extended SOR, the terminal device can first determine the priority of the ongoing service of the terminal device based on the received first extended SOR information, and then perform a corresponding network transfer operation based on the determined priority, that is, the public land mobile network (PLMN) where the terminal device currently camps is transferred to the target PLMN to implement network transfer. In this way, classifying the priority of the service and performing the network transfer corresponding to the priority of the service can avoid that transferring to another network is not performed until all ongoing services in the terminal device are completed, thereby improving efficiency of the network transfer.

The network transfer apparatus in this embodiment of this application may be an apparatus, or a component, an integrated circuit, or a chip in a terminal. The apparatus may be a mobile terminal, or a non-mobile terminal. For example, the mobile terminal may include but is not limited to the foregoing types of the terminal 11. The non-mobile terminal may be a server, a network attached storage (NAS), a personal computer (PC), a television (TV), a teller machine, a self-service machine, or the like. This is not specifically limited in this embodiment of this application.

The network transfer apparatus in this embodiment of this application may be an apparatus with an operating system. The operating system may be an Android operating system, may be an iOS operating system, or may be another possible operating system, which is not specifically limited in the embodiments of this application.

The network transfer apparatus provided in this embodiment of this application can implement the processes implemented in the method embodiments in FIG. 2 and FIG. 4 to FIG. 8, with the same technical effects achieved. To avoid repetition, details are not described herein again.

It should be noted that an execution subject of the network transfer method according to an embodiment of this application may be a network transfer apparatus, or a control module for performing the network transfer method in the network transfer apparatus. In this embodiment of this application, the network transfer apparatus according to an embodiment of this application is described by using an example in which the network transfer apparatus performs the network transfer method.

Figure 10:
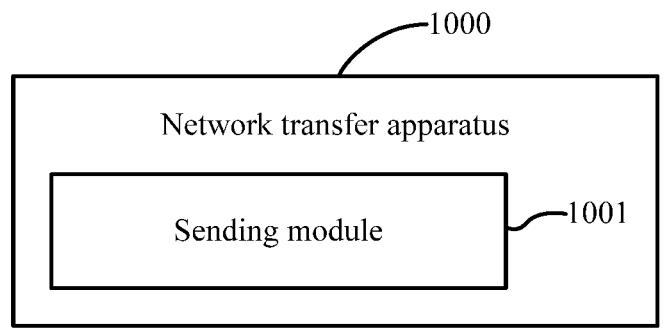
FIG. 10 is another structural diagram of a network transfer apparatus according to an embodiment of this application.

Referring to FIG. 10, an embodiment of this application provides a network transfer apparatus 1000. The network transfer apparatus 1000 includes:

a sending module 1001, configured to, in a case that a terminal device supports negotiation and extended steering of roaming SOR capability, send first extended SOR information to the terminal device, where the first extended SOR information is used to determine a priority of an ongoing service in the terminal device, the priority of the ongoing service matches a transfer operation to be performed by the terminal device, and the transfer operation is an operation that the terminal device transfers from a currently camping public land mobile network PLMN to a target PLMN.

Optionally, in the network transfer apparatus 1000 in this embodiment of this application, the first extended SOR information includes a target object, and the target object is used to determine the priority of the ongoing service in the terminal device, where the target object includes at least one of the following:

a service list, where the service list includes at least one service and a priority corresponding to the at least one service; and a network parameter list, where the network parameter list includes at least one service and a priority corresponding to the at least one service.

Optionally, in the network transfer apparatus 1000 in this embodiment of this application, the network parameter list further includes at least one of the following:

single network slice selection assistance information S-NSSAI related information; data network name DNN related information; 5G quality of service QoS identifier related information; protocol data unit PDU session related information; Internet protocol IP address information; and packet filter information.

Optionally, in the network transfer apparatus 1000 in this embodiment of this application, in a case that a PLMN in which the terminal device currently camps is a visited PLMN, the first extended SOR information is encrypted extended SOR information.

Optionally, in the network transfer apparatus 1000 in this embodiment of this application, in a case that a PLMN in which the terminal device currently camps is a home PLMN, the first extended SOR information is unencrypted extended SOR information.

Optionally, the network transfer apparatus 1000 in this embodiment of this application may further include:

a receiving module, configured to, in a case that the terminal device supports negotiation and extended steering of roaming SOR capability, before the sending first extended SOR information to the terminal device, receive first indication information reported by the terminal device, where the first indication information is used to indicate whether the terminal device supports the capability of negotiating extended SOR.

Optionally, in the network transfer apparatus 1000 in this embodiment of this application, the receiving module may be further configured to:

in a case that the first indication information indicates that the terminal device supports the capability of negotiating extended SOR, receive second extended SOR information sent by the terminal device in a process of registering in the currently camping PLMN.

Optionally, the network transfer apparatus 1000 in this embodiment of this application may further include:

a first determining module, configured to, before the sending first extended SOR information to the terminal device, based on at least one of the second extended SOR information and extended SOR information corresponding to the network side device, determine the first extended SOR information.

Optionally, in the network transfer apparatus 1000 in this embodiment of this application, the first extended SOR information includes one of the following:

the second extended SOR information and information corresponding to a union set of the extended SOR information corresponding to the network side device; the second extended SOR information and information corresponding to an intersection set of the extended SOR information corresponding to the network side device; the second extended SOR information; and the extended SOR information corresponding to the network side device.

Optionally, in the network transfer apparatus 1000 in this embodiment of this application, the receiving module may be further configured to:

in a case that the first indication information indicates that the terminal device supports the capability of negotiating extended SOR, receive third extended SOR information sent by the terminal device, when the terminal device learns the network side device supports the capability of negotiating extended SOR, in a process of updating triggered and extended SOR information.

Optionally, in the network transfer apparatus 1000 in this embodiment of this application, the sending module 1001 may be further configured to:

before receiving the third extended SOR information sent by the terminal device, send second indication information to the terminal device, where the second indication information is used to indicate whether the network side device supports the capability of negotiating extended SOR.

Optionally, the network transfer apparatus 1000 in this embodiment of this application may further include:

a second determining module, configured to, before the sending first extended SOR information to the terminal device, based on at least one of the third extended SOR information and extended SOR information corresponding to the network side device, determine the first extended SOR information.

Optionally, in the network transfer apparatus 1000 in this embodiment of this application, the first extended SOR information includes one of the following:

the third extended SOR information and information corresponding to a union set of the extended SOR information corresponding to the network side device; the third extended SOR information and information corresponding to an intersection set of the extended SOR information corresponding to the network side device; the third extended SOR information; and the extended SOR information corresponding to the network side device.

In this embodiment of this application, the network side device can provide the first extended roaming oriented SOR information to the terminal device, so that in a case that the terminal device supports the capability of negotiating extended SOR, the terminal device can first determine the priority of the ongoing service of the terminal device based on the received first extended SOR information, and then perform a corresponding network transfer operation based on the determined priority, that is, the public land mobile network (PLMN) where the terminal device currently camps is transferred to the target PLMN to implement network transfer. In this way, classifying the priority of the service and performing the network transfer corresponding to the priority of the service by the terminal device can avoid that transferring to another network is not performed until all ongoing services in the terminal device are completed, thereby improving efficiency of the network transfer.

The network transfer apparatus in this embodiment of this application may be an apparatus, or a component, an integrated circuit, or a chip in a network side device. The apparatus may be a network side device. For example, the network side device may include, but is not limited to, types of the network side devices 12 listed above.

The network transfer apparatus in this embodiment of this application may be an apparatus with an operating system. The operating system may be an Android operating system, may be an iOS operating system, or may be another possible operating system, which is not specifically limited in the embodiments of this application.

The network transfer apparatus provided in this embodiment of this application can implement the processes implemented in the method embodiments in FIG. 3 to FIG. 8, with the same technical effects achieved. To avoid repetition, details are not described herein again.

Figure 11:
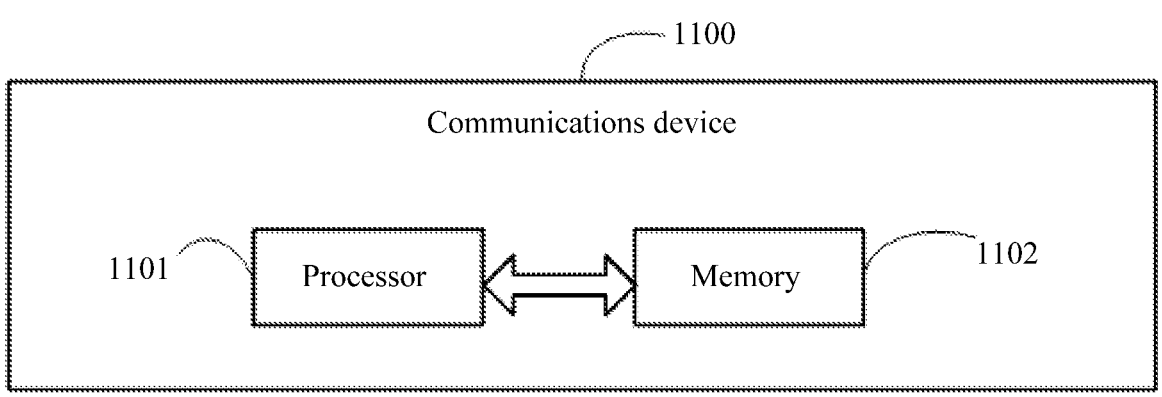
FIG. 11 is a structural diagram of a communications device according to an embodiment of this application.

Optionally, as shown in FIG. 11, an embodiment of this application further provides a communications device 1100, including a processor 1101, a memory 1102, and a program or an instruction stored in the memory 1102 and capable of running on the processor 1101. For example, when the communications device 1100 is a terminal, and the program or the instruction is executed by the processor 1101, the processes of the foregoing network transfer method embodiments corresponding to FIG. 2 and FIG. 4 to FIG. 8 are implemented, with the same technical effects achieved. To avoid repetition, details are not described herein again. When the communications device 1100 is a network-side device, and the program or the instruction is executed by the processor 1101, the processes of the network transfer method corresponding to FIG. 3 to FIG. 8 is implemented, with the same technical effects achieved. To avoid repetition, details are not described herein again.

Figure 12:
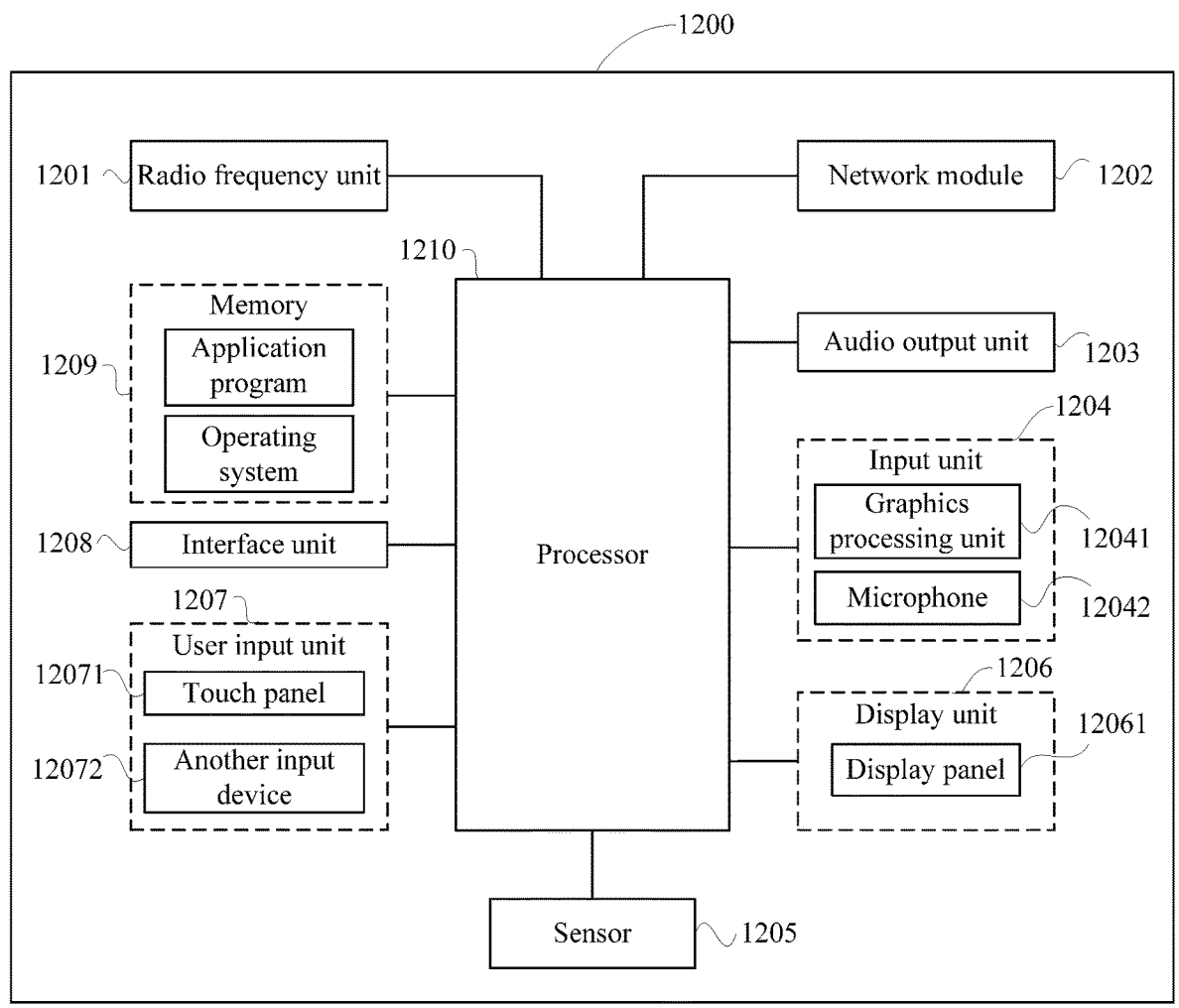
FIG. 12 is a structural diagram of a terminal device according to an embodiment of this application.

FIG. 12 is a schematic diagram of a hardware structure of a terminal according to an embodiment of this application.

The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

It may be understood by a person skilled in the art that the terminal 1200 may further include a power supply (such as a battery) that supplies power to each component. The power supply may be logically connected to the processor 1210 by using a power management system, to implement functions such as charging, discharging, and power consumption management by using the power management system. The terminal structure shown in FIG. 12 constitutes no limitation on the terminal, and the terminal may include more or fewer components than those shown in the figure, or combine some components, or have different component arrangements. Details are not described herein.

It should be understood that, in this embodiment of this application, the input unit 1204 may include a graphics processing unit (GPU) 12041 and a microphone 12042. The graphics processing unit 12041 processes image data of a static picture or a video obtained by an image capture apparatus (such as a camera) in a video capture mode or an image capture mode. The display unit 1206 may include a display panel 12061, and the display panel 12061 may be configured in a form of a liquid crystal display, an organic light-emitting diode, or the like. The user input unit 1207 includes a touch panel 12071 and another input device 12072. The touch panel 12071 is also referred to as a touchscreen. The touch panel 12071 may include two parts: a touch detection apparatus and a touch controller. The another input device 12072 may include but is not limited to a physical keyboard, a functional button (such as a volume control button or a power on/off button), a trackball, a mouse, and a joystick. Details are not described herein.

In this embodiment of this application, the radio frequency unit 1201 receives downlink data from a network side device and then sends the downlink data to the processor 1210 for processing; and sends uplink data to the network side device. Usually, the radio frequency unit 1201 includes but is not limited to an antenna, at least one amplifier, a transceiver, a coupler, a low noise amplifier, a duplexer, and the like.

The memory 1209 may be configured to store a software program or an instruction and various data. The memory 1209 may mainly include a program or instruction storage area and a data storage area. The program or instruction storage area may store an operating system, and an application or an instruction required by at least one function (for example, a sound playing function or an image playing function). In addition, the memory 1209 may include a high-speed random access memory, or may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage component, a flash memory component, or another non-volatile solid-state storage component.

The processor 1210 may include one or more processing units. Optionally, an application processor and a modem processor may be integrated into the processor 1210. The application processor mainly processes an operating system, a user interface, an application, an instruction, or the like. The modem processor mainly processes wireless communications, for example, a baseband processor. It can be understood that, alternatively, the modem processor may not be integrated into the processor 1210.

The radio frequency unit 1201 is configured to receive first extended steering of roaming SOR information sent by a network side device. The processor 1210 is configured to, in a case that the terminal device supports the capability of negotiating extended SOR, determine a priority of an ongoing service based on the first extended SOR information; and perform a transfer operation matching the priority of the ongoing service, where the transfer operation is an operation that the terminal device transfers from a currently camping public land mobile network PLMN to a target PLMN.

In this embodiment of this application, in a case that the terminal device receives the first extended steering of roaming SOR information sent by the network side device and simultaneously supports the capability of negotiating extended SOR, the terminal device can first determine the priority of the ongoing service of the terminal device based on the received first extended SOR information, and then perform a corresponding network transfer operation based on the determined priority, that is, the public land mobile network (PLMN) where the terminal device currently camps is transferred to the target PLMN to implement network transfer. In this way, classifying the priority of the service and performing the network transfer corresponding to the priority of the service can avoid that transferring to another network is not performed until all ongoing services in the terminal device are completed, thereby improving efficiency of the network transfer.

Figure 13:
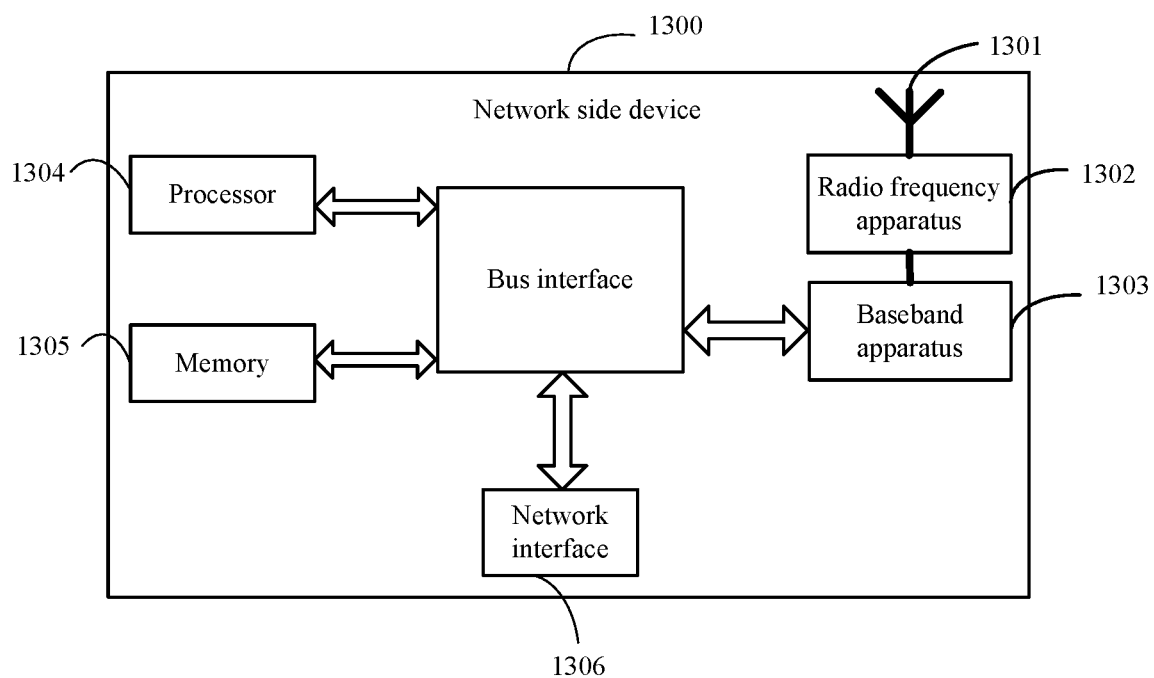
FIG. 13 is a structural diagram of a network side device according to an embodiment of this application.

An embodiment of this application further provides a network-side device. As shown in FIG. 13, a network device 1300 includes an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and transmits the received information to the baseband apparatus 1303 for processing. In a downlink direction, the baseband apparatus 1303 processes information that needs to be sent, and sends processed information to the radio frequency apparatus 1302. The radio frequency apparatus 1302 processes the received information, and sends processed information by using the antenna 1301.

The frequency band processing apparatus may be located in the baseband apparatus 1303. The method performed by the network-side device in the foregoing embodiment may be implemented in the baseband apparatus 1303. The baseband apparatus 1303 includes a processor 1304 and a memory 1305.

The baseband apparatus 1303 may include, for example, at least one baseband board, where a plurality of chips are disposed on the baseband board. As shown in FIG. 13, one chip is, for example, the processor 1304, which is connected to the memory 1305, so as to invoke a program in the memory 1305 to perform operations of the network device shown in the foregoing method embodiment.

The baseband apparatus 1303 may further include a network interface 1306, configured to exchange information with the radio frequency apparatus 1302, where the interface is, for example, a common public radio interface (CPRI).

Specifically, the network-side device in this embodiment of the present invention further includes an instruction or a program stored in the memory 1305 and executable by the processor 1304. The processor 1304 invokes the instruction or the program in the memory 1305 to perform the method performed by the modules shown in FIG. 10, and the same technical effect can be achieved. To avoid repetition, details are not described herein again.

An embodiment of this application further provides a readable storage medium. The readable storage medium stores a program or an instruction. When the program or the instruction is executed by a processor, the processes of any foregoing embodiments of the network transfer method are implemented, and the same technical effect can be achieved. To avoid repetition, details are not described herein again.

The processor is a processor in the terminal device or the network-side device in the foregoing embodiments. The readable storage medium includes a computer-readable storage medium such as a computer read-only memory (ROM), a random access memory (RAM), a magnetic disk, or an optical disc.

An embodiment of this application further provides a computer program product. The computer program product includes a processor, a memory, and a program or an instruction stored in the memory and capable of running on the processor. When the program or the instruction is executed by the processor, the processes of the foregoing corresponding network transfer method embodiments are implemented, with the same technical effects achieved. To avoid repetition, details are not described herein again.

An embodiment of this application further provides a chip. The chip includes a processor and a communications interface, and the communications interface is coupled to the processor. The processor is configured to run a program or an instruction of a terminal device or a network-side device, to implement various processes of the foregoing corresponding network transfer method embodiments, with the same technical effects achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A network transfer method, applied to a terminal device, wherein the method comprises:
    receiving first extended steering of roaming SOR information sent by a network side device;
    in a case that the terminal device supports a capability of negotiating extended SOR, determining a priority of an ongoing service based on the first extended SOR information; and
    performing a transfer operation matching the priority of the ongoing service, wherein the transfer operation is an operation that the terminal device transfers from a currently camping public land mobile network PLMN to a target PLMN.

2. The method according to claim 1, wherein the performing a transfer operation matching the priority of the ongoing service comprises:
    in a case that the ongoing service comprises a service of a first priority, performing the transfer operation after the service of the first priority is completed, wherein the first priority is higher than a preset priority.

3. The method according to claim 1, wherein the performing a transfer operation matching the priority of the ongoing service further comprises:
in a case that the ongoing service does not comprise the service of the first priority, performing the transfer operation.

4. The method according to claim 3, wherein in a case that the ongoing service does not comprise the service of the first priority, the performing the transfer operation comprises:
in a case that the ongoing service does not comprise the service of the first priority, performing the transfer operation after a preset timer expires.

5. The method according to claim 1, wherein the determining a priority of an ongoing service based on the first extended SOR information comprises:
based on a target object comprised in the first extended SOR information, determining the priority of the ongoing service, wherein
the target object comprises at least one of the following:
a service list, wherein the service list comprises at least one service and a priority corresponding to the at least one service; and
a network parameter list, wherein the network parameter list comprises at least one service and a priority corresponding to the at least one service.

6. The method according to claim 5, wherein the network parameter list further comprises at least one of the following:
single network slice selection assistance information S-NSSAI related information;
data network name DNN related information;
5G quality of service QoS identifier related information;
protocol data unit PDU session related information;
Internet protocol IP address information; and
packet filter information.

7. The method according to claim 1, wherein in a case that the terminal device supports a capability of negotiating extended SOR, before the determining a priority of an ongoing service based on the first extended SOR information, the method further comprises one of the following:
in a case that a PLMN in which the terminal device currently camps is a visited PLMN, verifying the first extended SOR information; and
in a case that the PLMN in which the terminal device currently camps is a home PLMN, skipping verifying the first extended SOR information.

8. The method according to claim 1, wherein in a case that the terminal device supports a capability of negotiating extended SOR, before the determining a priority of an ongoing service based on the first extended SOR information, the method further comprises:
reporting first indication information to the network side device, wherein the first indication information is used to indicate whether the terminal device supports the capability of negotiating extended SOR.

9. The method according to claim 8, wherein the method further comprises:
in a case that the terminal device supports the capability of negotiating extended SOR, sending second extended SOR information to the network side device in a process that the terminal device registers in the currently camping PLMN.

10. The method according to claim 9, wherein the method further comprises:
replacing the second extended SOR information with the first extended SOR information.

11. The method according to claim 8, wherein the method further comprises:
in a case that both the terminal device and the network side device support the capability of negotiating extended SOR, sending third extended SOR information to the network side device in a process of updating triggered and extended SOR information.

12. The method according to claim 11, wherein the method further comprises:
in a case that the latest extended SOR information sent by the network side device in response to a process of updating the extended SOR information, replacing the third extended SOR information with the latest extended SOR information.

13. The method according to claim 11, wherein before the sending third extended SOR information to the network side device, the method further comprises:
receiving second indication information sent by the network side device, wherein the second indication information is used to indicate whether the network side device supports the capability of negotiating extended SOR; and
in a case that the second indication information indicates that the network side device supports the capability of negotiating extended SOR, triggering a process of updating the extended SOR information.

14. A network transfer method, applied to a network side device, wherein the method comprises:
in a case that a terminal device supports negotiation and extended steering of roaming SOR capability, sending first extended SOR information to the terminal device, wherein
the first extended SOR information is used to determine a priority of an ongoing service in the terminal device, the priority of the ongoing service matches a transfer operation to be performed by the terminal device, and the transfer operation is an operation that the terminal device transfers from a currently camping public land mobile network PLMN to a target PLMN.

15. The method according to claim 14, wherein the first extended SOR information comprises a target object, and the target object is used to determine the priority of the ongoing service in the terminal device, wherein the target object comprises at least one of the following:
a service list, wherein the service list comprises at least one service and a priority corresponding to the at least one service; and
a network parameter list, wherein the network parameter list comprises at least one service and a priority corresponding to the at least one service.

16. The method according to claim 15, wherein the network parameter list further comprises at least one of the following:
single network slice selection assistance information S-NSSAI related information;
data network name DNN related information;
5G quality of service QoS identifier related information;
protocol data unit PDU session related information;
Internet protocol IP address information; and
packet filter information.

17. A network-side device, comprising a memory, a processor, and a program or an instruction stored in the memory and capable of running on the processor, wherein when the program or the instruction is executed by the processor, the steps of the method according to claim 14 are implemented.

18. A terminal device, comprising a memory, a processor, and a program or an instruction stored in the memory and capable of running on the processor, wherein when the program or the instruction is executed by the processor, the following steps are implemented:
- receiving first extended steering of roaming SOR information sent by a network side device;
- in a case that the terminal device supports a capability of negotiating extended SOR, determining a priority of an ongoing service based on the first extended SOR information; and
- performing a transfer operation matching the priority of the ongoing service, wherein the transfer operation is an operation that the terminal device transfers from a currently camping public land mobile network PLMN to a target PLMN.

19. The terminal device according to claim 18, wherein when the program or the instruction is executed by the processor, the following steps are further implemented:
- in a case that the ongoing service comprises a service of a first priority, performing the transfer operation after the service of the first priority is completed, wherein the first priority is higher than a preset priority.

20. The terminal device according to claim 18, wherein when the program or the instruction is executed by the processor, the following steps are further implemented:
- in a case that the ongoing service does not comprise the service of the first priority, performing the transfer operation.

* * * * *